(12) United States Patent
Brown et al.

(10) Patent No.: US 7,099,975 B2
(45) Date of Patent: Aug. 29, 2006

(54) METHOD OF RESOURCE ARBITRATION

(75) Inventors: Jeffrey Douglas Brown, Rochester, MN (US); Scott Douglas Clark, Rochester, MN (US); Charles Ray Johns, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 10/730,952

(22) Filed: Dec. 9, 2003

(65) Prior Publication Data

US 2005/0125581 A1    Jun. 9, 2005

(51) Int. Cl.
*G06F 12/00* (2006.01)

(52) U.S. Cl. .................. 710/240; 710/243; 710/244

(58) Field of Classification Search ........ 710/240–244, 710/116, 119, 120; 370/230.1, 412, 395.41, 370/395.42, 395.43
See application file for complete search history.

(56) References Cited

U.S. PATENT DOCUMENTS

| | | | | |
|---|---|---|---|---|
| 5,832,278 A | * | 11/1998 | Pham | 710/243 |
| 5,850,399 A | * | 12/1998 | Ganmukhi et al. | 370/412 |
| 6,385,678 B1 | * | 5/2002 | Jacobs et al. | 710/113 |
| 6,438,134 B1 | * | 8/2002 | Chow et al. | 370/412 |
| 6,473,817 B1 | * | 10/2002 | Jeddeloh | 710/113 |
| 6,909,691 B1 | * | 6/2005 | Goyal et al. | 370/230 |
| 2004/0210695 A1 | * | 10/2004 | Weber et al. | 710/240 |

* cited by examiner

*Primary Examiner*—Khanh Dang
(74) *Attorney, Agent, or Firm*—Carr LLP; Diana R. Gerhardt (57) ABSTRACT

An improved method and apparatus for resource arbitration. Four priority classes, managed high (MH), managed low (ML), opportunistic high (OH) and opportunistic low (OL), are defined. A priority class is assigned to each resource access request. An access request concentrator (ARC) is created for each resource, through which the resource is accessed. An access request is chosen at each ARC using the priority order MH, ML, OH, and OL, in decreasing order of priority. If OH priority class resource access requests are locked out, the priority order is temporarily changed to OH, OL, MH, and ML, in decreasing order of priority. If OL priority class resource access requests are locked out, the priority order is temporarily changed to MH, OL, OH, and ML, in decreasing order of priority.

18 Claims, 4 Drawing Sheets

METHOD OF RESOURCE ARBITRATION

FIELD OF THE INVENTION

The invention relates generally to arbitration of shared resources and, more particularly, to addressing lockout situations.

BACKGROUND OF THE INVENTION

In conventional systems, when arbitrating access to a shared resource, several priority classes are typically defined, and access to the resource is based on these priority classes. Priority classes are assigned to resource access requests based on how critical the request to access the resource is.

In a computer, for example, numerous resources, such as the processor, memory, disk space, and bus bandwidth, are all accessed by one or more components of the computer, and hence are shared resources. These components can be hardware, software or both. Depending on, the circumstances, each component can require a different priority class for accessing a shared resource.

One of the problems, in an arbitration scheme in which priority classes are defined and resource access is allowed in order of descending priority, as in conventional systems, is for higher priority requests to monopolize a resource to the extent that lower priority requests are 'locked out', i.e., prevented from accessing the resource for an extended period of time.

Therefore, there is a need for an improved method of resource arbitration.

SUMMARY OF THE INVENTION

An improved method and apparatus for resource arbitration are presented. Four priority classes, managed high (MH), managed low (ML), opportunistic high (OH) and opportunistic low (OL), are defined. A priority class is assigned to each resource access request. An access request concentrator (ARC) is created for each resource, through which the resource is accessed. An access request is chosen at each ARC using the priority order MH, ML, OH, and OL, in decreasing order of priority. If OH priority class resource access requests are locked out, the priority order is temporarily changed to OH, OL, MH, and ML, in decreasing order of priority. If OL priority class resource access requests are locked out, the priority order is temporarily changed to MH, OL, OH, and ML, in decreasing order of priority.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU regardless of whether the MPU is the sole computational element in the device or whether the MPU is sharing the computational element with other MPUs.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
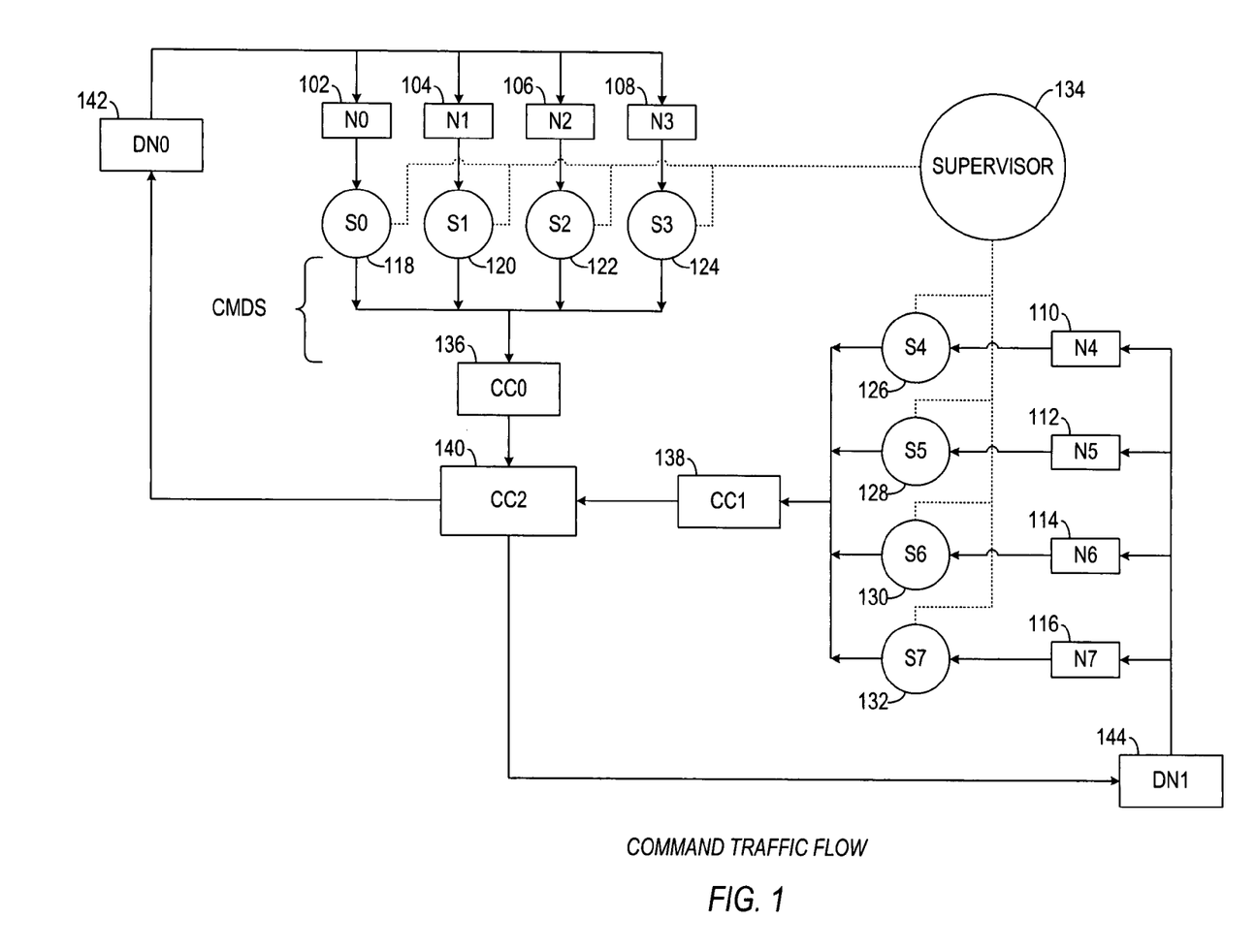
FIG. 1 is a block diagram of command traffic flow.

Referring to FIG. 1, the reference numeral 100 generally designates a block diagram of a computer system embodying features of the present invention.

Nodes, N0 102, N1 104, N2 106, N3 108, N4 110, N5 112, N6 114, and N7 116, generate traffic, comprised of commands and data. This method can be used for computer systems where some, all or none of the nodes can be within the computer system or outside the computer system.

Each node has a corresponding shaper; node N0 102 has a shaper S0 118, node N1 104 has a shaper S1 120, node N2 106 has a shaper S2 122, node N3 108 has a shaper S3 124, node N4 110 has a shaper S4 126, node N5 112 has a shaper S5 128, node N6 114 has a shaper S6 130, and node N7 116 has a shaper S7 132. The traffic generated by each node is sent to the node's corresponding shaper.

Each node may be communicating with one or more other nodes, and this traffic is multiplexed and sent through each node's shaper. Each shaper continually examines the traffic sent by its node, and restricts its node's traffic as necessary based on the shaper's programming and the priority class of the individual components of the traffic.

A supervisor node 134 programs each shaper to allow a specified amount of command traffic and a specified amount of data traffic within a given period. For example, a shaper can be programmed to allow only fifty commands of a certain priority class within one thousand machine cycles, or allow only fifty commands of a certain priority class into traffic for every thousand commands sent.

Supervisor node 134 is aware of significant events that occur in the network, and can dynamically alter the programming of one or more shapers to better meet the traffic needs of the network.

For example, if traffic generated by node N0 102 and destined for node N7 116 is initially of a critical nature, shaper S0 118 can be programmed to allow more traffic from node N0 102, and the other shapers programmed to allow proportionately less traffic from their respective nodes. When an event occurs such that the traffic generated by node N0 102 and destined for node N7 116 is no longer as critical, but traffic generated by node N5 112 and destined for node N2 106 is now critical, supervisor 134 can program shaper S0 118 to let in less traffic from node N0 102, and program shaper S5 128 to let in more traffic from node N5 112.

Command traffic from the shapers S0 118, S1 120, S2 122, and S3 124 is sent to a command concentrator CC0 136, while command traffic from shapers S4 126, S5 128, S6 130, and S7 132 is sent to a command concentrator CC1 138. Each shaper also sends out data traffic, which will be discussed later in this description.

Command concentrator CC0 136 and CC1 138 each send their traffic on to a command concentrator CC2 140. Each command concentrator takes traffic from multiple nodes, filtered through multiple shapers, with different priority classes, and decides the order in which the traffic is sent on to its destination. Each command concentrator uses a method, discussed later, that allows multiple streams of traffic, containing traffic with varying priorities, access to a shared resource in a way that higher priority traffic is given priority access, but not to the exclusion of lower priority traffic.

Each command concentrator, CC0 136, CC1 138 and CC2 140, uses one or more arbitration points to choose the order in which the command traffic sent to each command concentrator is sent to its destination. For example, in command concentrator CC0 136, the command traffic output of the four shapers N0 102, N1 104, N2 106 and N3 108 can be concentrated using one arbitration point that takes the output of the four shapers and repeatedly chooses a command from among the four presented to it and sends it on to CC2 140. The method used by a command concentrator to choose a command will be detailed later in this description.

In this example, there are two levels of command concentrators, with CC0 136 and CC1 138 as the first level and CC2 140 as the second level. This method can be used with one or more levels of command concentrators.

Once CC2 140 has concentrated the commands, they are sent to distribution nodes DN0 142 and DN1 144, which then send the commands on to each command's destination node. For example, if node N0 102 wants to send a command to node N7 116, the command goes from node N0 102 to shaper S0 118, from shaper S0 118 to command concentrator CC0 136, from command concentrator CC0 136 to command concentrator CC2 140, from command concentrator CC2 140 to distribution node DN1 144, and from distribution node DN1 144 to node N7 116.

In this description, CC0 136, CC1 138, CC2 140, DN0 142 and DN1 144 comprise the command bus. This method can be used for computer systems where the command bus is separate and distinct from a data bus or where commands and data travel over the same, combined bus.

Typically, a node will first attempt to send a command, such as a write command, and only when the node's shaper allows the command into traffic does the node follow the command with a piece of data associated with the command, such as the value to be written. Each command can have an associated priority class and, independently, each piece of data associated with the command can have its own priority class.

Since, in most cases, each command has an associated piece of data, the command is first arbitrated and, once sent into traffic, the associated data is then arbitrated and sent into traffic. Command arbitration is a way of arbitrating the associated data, since the data will not enter into traffic until its associated command is first arbitrated and sent into traffic.

Figure 2:
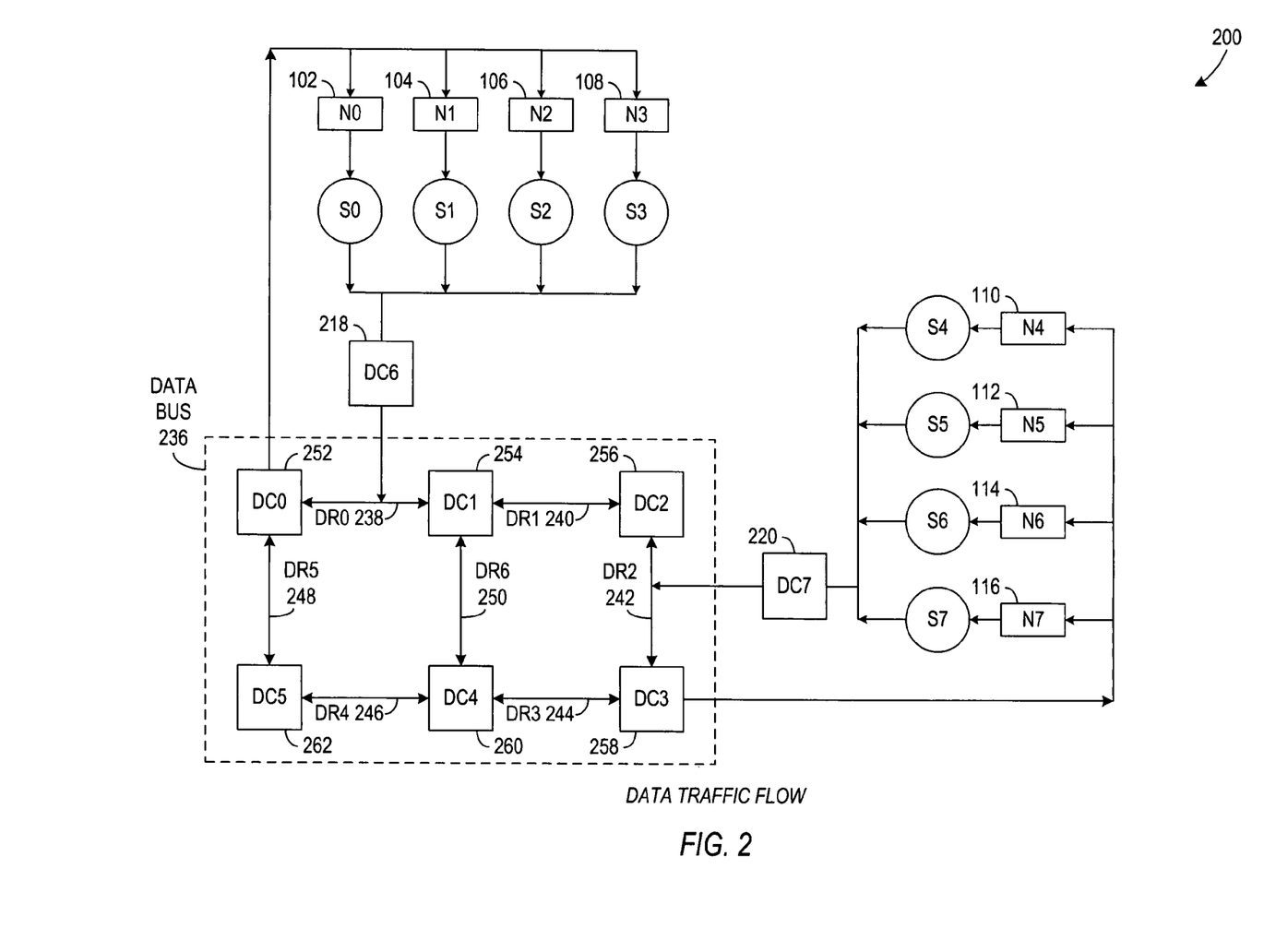
FIG. 2 is a block diagram of data traffic flow.

Now referring to FIG. 2, the reference numeral 200 generally designates a block diagram of data traffic flow, embodying features of the present invention.

Note that nodes N0, N1, N2, N3, N4, N5, N6, N7 in FIG. 1 and FIG. 2 reference the same entities. Because of the complex nature of the traffic flow, command traffic flow and data traffic flow are shown separately in FIG. 1 and FIG. 2, respectively, for the sake of clarity. However, FIG. 1 and FIG. 2 should be viewed together for a complete overview of command and data traffic flow.

Nodes, N0 102, N1 104, N2 106, N3 108, N4 110, N5 112, N6 114, and N7 116, generate traffic comprised of commands and data.

Data traffic travels from one node to another along a path. A path is comprised of one or more routes. In FIG. 2, data bus 236 has routes DR0 238, DR1 240, DR2 242, DR3 244, DR4 246, DR5 248 and DR6 250.

Data traffic from node N0 102 to node N7 116 might, for example, take a path comprised of routes DR0 238, DR1 240, and DR2 242. Each route has a maximum amount of bandwidth available. Typically, not all routes will have the same maximum bandwidth.

As data traffic travels on its path, it passes through a data concentrator wherever two or more data routes join. Each set of nodes also has a corresponding data concentrator which controls the flow of data commands onto the data bus. In FIG. 2, the data traffic from nodes N0 102, N1 104, N2 106, and N3 108 is arbitrated by data concentrator DC6 before being sent to the data bus; the data traffic from nodes N4 110, N5 112, N6 114, and N7 116 is arbitrated by data concentrator DC7 before being sent to the data bus; and data bus 236 has data concentrators DC0 252, DC1 254, DC2 256, DC3 258, DC4 260, and DC5 262.

A data concentrator, like a command concentrator, is comprised of one or more arbitration points. Each concentrator takes traffic from multiple nodes, filtered through multiple shapers, with different priority classes, and decides the order in which the traffic is sent on to its destination. Each concentrator allows multiple streams of traffic, containing traffic with varying priorities, access to a shared resource in a way that higher priority traffic is given priority access, but not to the exclusion of lower priority traffic.

For example, if node N0 102 wants to send data traffic to N7 116, the data goes from N0 102 to DC6 218, from DC6 218 to DR0 238, from DR0 238 to DC1 254, from DC1 254 to DR1 240, from DR1 240 to DC2 256, from DC2 256 to DR2 242, from DR2 242 to DC3 258, and from DC3 258 to N7 116. In FIG. 2, DC0 252 is shown to distribute data traffic to nodes N0 102, N1 104, N2 106 and N3 108, while DC3 258 is shown to distribute data traffic to nodes N4 110, N5 112, N6 114 and N7 116. In a specific implementation, the data traffic concentrators selected to distribute traffic to a set of nodes can vary depending on the design needs of the computer system.

In this description, bandwidth is the resource being arbitrated. Traffic in the network must be managed in an attempt to satisfy the following four criteria: (i) certain types of traffic are guaranteed a minimum bandwidth; (ii) the amount of traffic does not exceed the maximum bandwidth available for each route; (iii) priority traffic is able to quickly reach its destination; and (iv) non-priority traffic is able to get through, i.e., it is not locked-out.

A lockout occurs when higher priority traffic consumes 100% of the available bandwidth, so that lower priority traffic is not able to reach its destination over a specified period of time. Factors such as the speed of the network, the available bandwidth, and how many priority and non-priority commands are being carried are all used to determine under what conditions a lockout is said to occur for a specific network.

Traffic that has been pre-allocated a specific amount of bandwidth is called managed traffic. The bandwidth negotiated can be a minimum bandwidth or a maximum bandwidth or both. Managed traffic typically has one or more of the following characteristics: (i) it is known in advance that the traffic will occur, (ii) it is expected that the traffic will remain active for a period of time, or (iii) the traffic is of a critical nature, such as time-critical. Traffic that does not have these characteristics is called opportunistic traffic because there is no bandwidth specifically reserved for it.

Traffic can further be categorized as high priority or low priority, resulting in four priority classes; managed high (MH), managed low (ML), opportunistic high (OH), and opportunistic low (OL).

Under normal circumstances, it is sufficient to concentrate traffic using arbitration points that choose traffic based on the priority order MH, ML, OH, and OL, in decreasing order of priority. However, there are two situations under which lockout can occur, and these are described in more detail later on in this description.

As was discussed in FIG. 1, each command has an associated data payload associated with it, so by shaping the commands, the data traffic associated with the commands is automatically shaped to meet the bandwidth requirements of a particular path. In one implementation, to simplify the shaping process and allow shaping to occur as quickly as possible, command traffic may be shaped by using the largest size of data payload that may be associated with a command.

The sum of all managed traffic for each route, DR0 238, DR1 240, DR2 242, DR3 244, DR4 246, DR5 248 and DR6 250, is less than 100% of the bandwidth available on each route, thus leaving bandwidth available for opportunistic traffic. For example, for route DR0 238, 80% of the bandwidth may be allocated for managed traffic, leaving 20% for opportunistic traffic.

MH traffic is high priority traffic for which the source node and destination node will not change, allowing the supervisor node to program the shapers in advance to allocate bandwidth.

ML traffic is usually high priority traffic for which the source node can change while the destination node remains the same. If some of the nodes are processors, one processor can be under utilized, and so in order to distribute the workload more evenly among the processors, the source node can be changed. For example, assume nodes N0 102, N3 108, and N5 112 are processors, and node N0 102 is generating ML traffic destined for N5 112. If an event occurs requiring N0 102 to do something that will occupy most of its processing power, and node N3 108 is being minimally utilized, the task of generating ML traffic destined for node N5 112 can be shifted from node N0 102 to node N3 108, leaving node N0 102 to perform the new task.

During this transition, when the source node is being shifted from node N0 102 to node N3 108, both source nodes will, for a brief period of time, be allocated bandwidth for the ML traffic that each node is generating. This happens because node N0 102 has initially been allocated bandwidth, and once the decision is made to transition the source node, node N3 108 is also allocated the same bandwidth as node N0 102, the task of generating ML traffic destined for node N5 112 is given to node N3 108, and then node N0 102 is told to stop generating ML traffic destined for node N5 112.

It is not possible, during the transition, to stop node N0 102 from generating ML traffic destined for node N5 112, and then tell node N3 108 to start generating ML traffic destined for node N5 112, because of the critical nature of the ML traffic. Thus, there is a brief period of time during which both source nodes N0 102 and N3 108 are generating ML traffic destined for node N5 112, and have bandwidth allocated to them along various routes for this purpose.

This is the first situation in which lockout can occur; i.e., when ML traffic generation is in transition from one source node to another source node, it is possible that OH and OL traffic can be locked out. For example, if the ML traffic being transitioned occupies 50% or more of the bandwidth of each route in its path, then it is possible during the transition, briefly, for both source nodes to each generate the same ML traffic, destined for the same source node, so that 100% of the bandwidth of one or more routes is occupied by ML traffic.

Thus, allocating bandwidth such that the sum of MH and ML traffic is less than 100% is not enough to prevent OH and OL lockout, because it is still possible that the sum of MH and two times ML can exceed 100% during an ML transition from one node to another, when both nodes are briefly sending the same ML traffic.

There is another situation in which lockout can occur. Since opportunistic traffic, by definition, is not managed, there are no controls governing OH traffic, and it is possible for one or more nodes to generate enough OH traffic such that 100% of the bandwidth left for opportunistic traffic is occupied, thus locking out OL traffic. For example, if 80% of the bandwidth is allocated for MH and ML, and OH traffic occupies the remaining 20%, this will result in OL traffic lockout.

This arbitration method can be used to address the situation where opportunistic traffic, OH and OL, is locked out and the situation where OL traffic is locked out.

Figure 3:
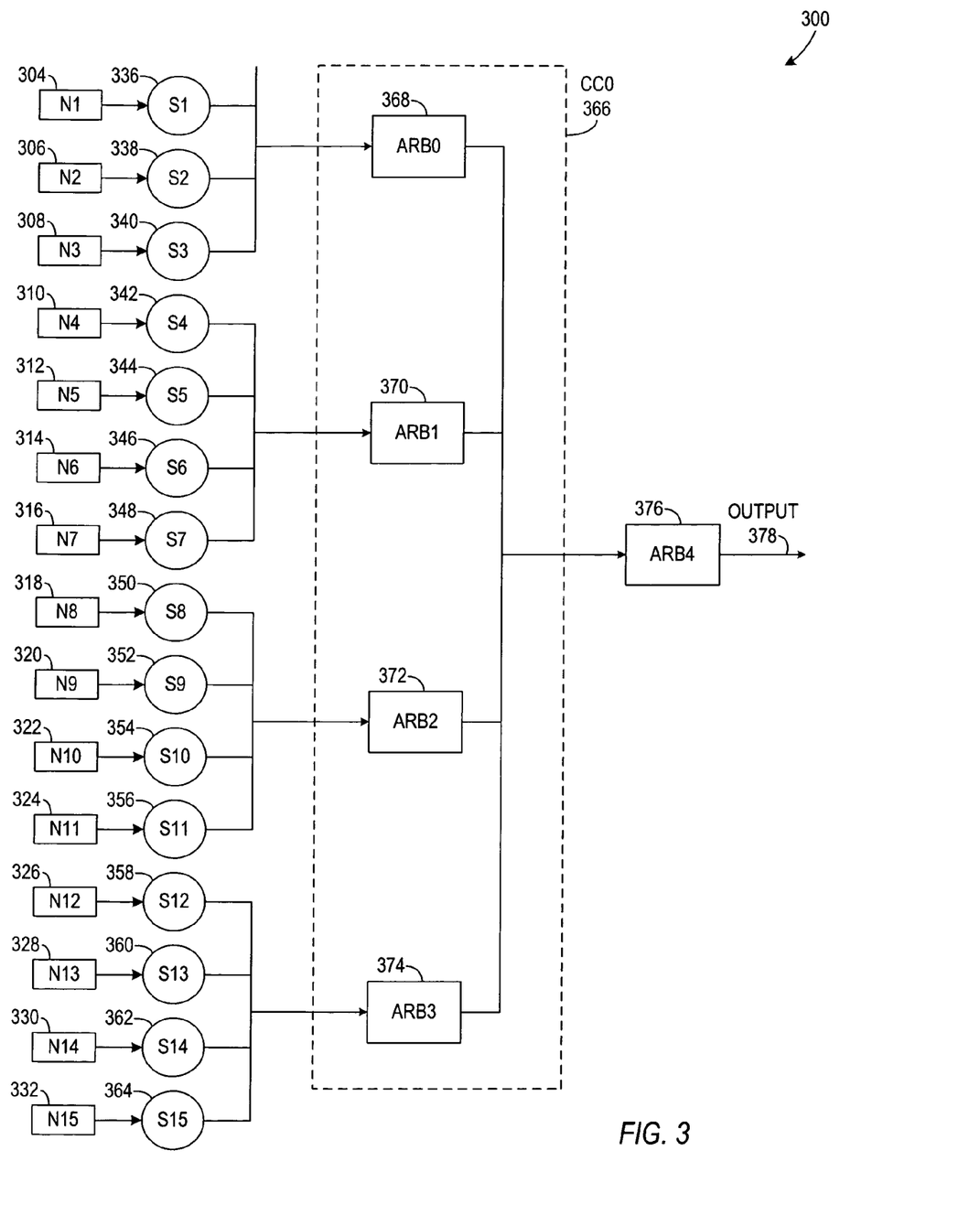
FIG. 3 is a block diagram of an arbitration tree.

Now referring to FIG. 3, the reference numeral 300 generally designates a block diagram of an arbitration tree, embodying features of the present invention.

As the number of nodes sending traffic increases, it is important for the command concentrator or data concentrator to be able to do its job quickly and efficiently. To achieve this, an arbitration tree is used in which (1) incoming traffic is divided into subgroups, and (2) an arbitration point is used for each subgroup, and the previous two steps repeated until a single command or piece of data is chosen and sent on to its destination, which is typically the shared resource for which access is being arbitrated.

In FIG. 3, there are sixteen nodes, N0 302, N1 304, N2 306, N3 308, N4 310, N5 312, N6 314, N7 316, N8 318, N9 320, N10 322, N11 324, N12 326, N13 328, N14 330, and N15 332 sending command and data traffic into their respective shapers S0 334, S1 336, S2 338, S3 340, S4 342, S5 344, S6 346, S7 348, S8 350, S9 352, S10 354, S11 356, S12 358, S13 360, S14 362, and S15 364.

The command traffic from each of the sixteen shapers is sent to command concentrator CC0 366. Command concentrator CC0 366 comprises five arbitration points, ARB0 368, ARB1 370, ARB2 372, ARB3 374, and ARB4 376. In this example, there are two levels of arbitration; however, this method can be used for one or more levels of arbitration.

In FIG. 3, the sixteen shapers are divided into four subgroups, with each subgroup comprised of four shapers. Thus shapers S0 334, S1 336, S2 338 and S3 340 are arbitrated by ARB0 368; shapers S4 342, S5 344, S6 346 and S7 348 are arbitrated by ARB1 370; shapers S8 350, S9 352, S10 354 and S1 356 are arbitrated by ARB2 372; and shapers S12 358, S13 360, S14 362 and S15 364 are arbitrated by ARB3 374.

The sixteen shapers each present a command, and each of the four arbitration points chooses one command from among the four presented to it. The result of this first level of arbitration is four commands, i.e., one command output from each of ARB0 368, ARB1 370, ARB2 372 and ARB3 374. These four commands are then arbitrated by ARB4 376, resulting in one command being sent to output 378.

The number of levels of arbitration and the size of the subgroups can vary depending on how many nodes there are and the number of shapers each arbitration point can efficiently handle. The reason for using multiple arbitration levels is to arbitrate as quickly and as efficiently as possible. Thus the number of subgroups and number of levels of arbitration are chosen to minimize the amount of time taken to arbitrate down to a single command.

Figure 4:
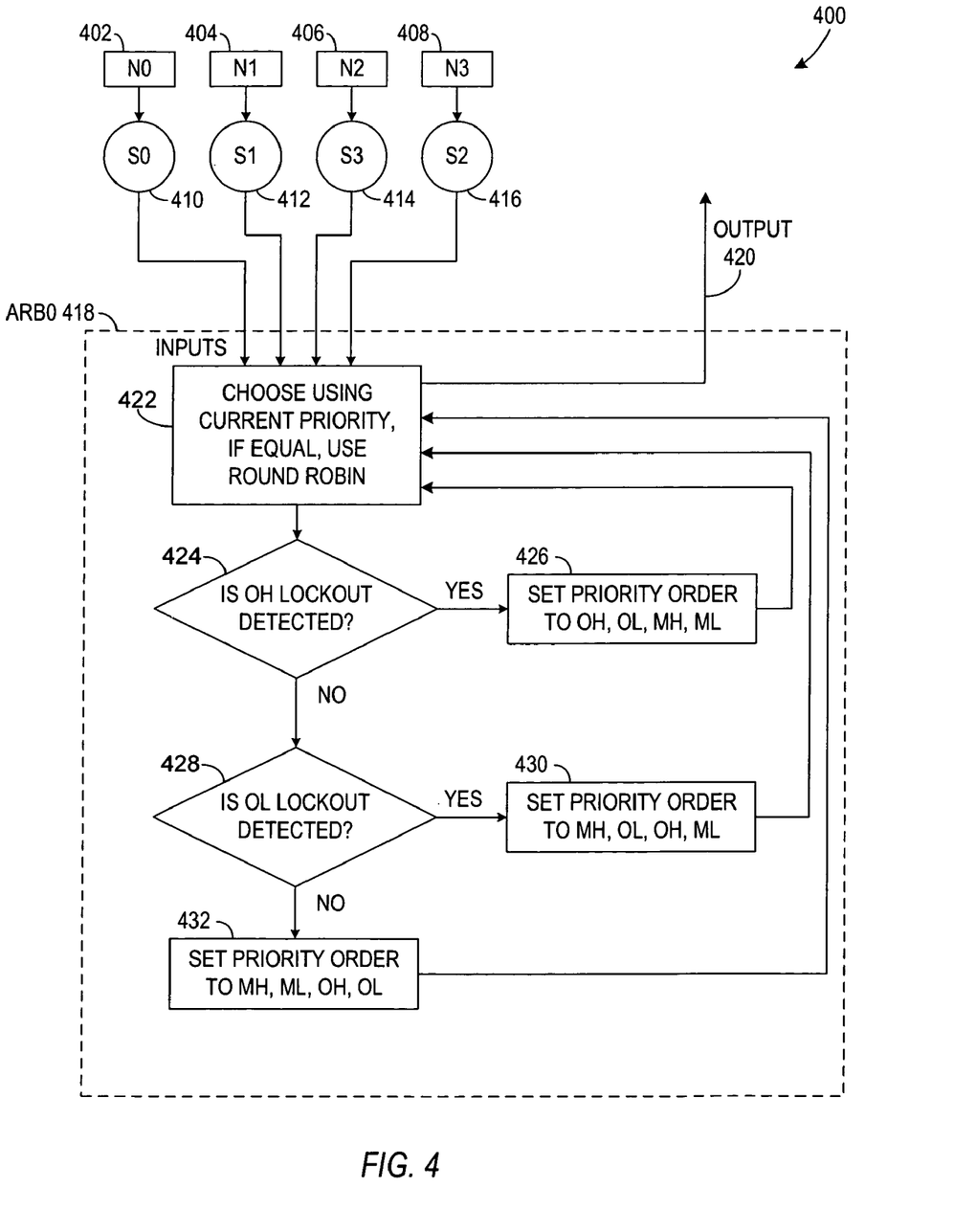
FIG. 4 is a block diagram of an arbitration algorithm.

Now referring to FIG. 4, the reference numeral 400 generally designates an arbitration algorithm, embodying features of the present invention.

Nodes N0 402, N1 404, N2 406, and N3 408 generate traffic, which is sent to shapers S0 410, S1 412, S2 414, and S3 416, respectively. Arbitration point ARB0 418 takes the command traffic from the four shapers S0 410, S1 412, S2 414 and S3 416, and continually chooses one command from the four commands at its inputs, and outputs a command at output 420.

In step 422, the four inputs, from shapers S0 410, S1 412, S2 414, and S3 416, are examined and the current priority order, which is initially set to MH, ML, OH, and OL, in decreasing order of priority, is used to choose one command to send to output 420. Thus, for the priority order MH, ML, OH, and OL, any command with a priority of MH will be chosen over commands of priority ML, OH, and OL; any command with a priority of ML will be chosen over commands of priority OH and OL; and any command of priority OH will be chosen over commands of priority OL.

If two or more commands are of the same priority, then a well known method, such as round robin, can be used to choose one of the commands.

In step 424, a check is done to see if OH traffic is locked out. Lockout occurs when traffic with a certain priority has not been sent in a specified period of time, such as a certain number of machine cycles or a certain number of commands. For example, OH traffic lockout can be defined as occurring when no OH priority commands are chosen and sent to output 420 in step 422 for every 100 commands sent or for every 500 MPU cycles.

If OH traffic lockout is detected in step 424, then in step 426 the priority order is temporarily set to OH, OL, MH, and ML in decreasing order, and this new priority order is used to choose a command in step 422. Doing this allows OH and OL traffic to be chosen over MH and ML traffic, temporarily, until OH lockout is no longer detected.

If OH traffic lockout is not detected in step 424, then in step 428 a check is done to see if OL traffic lockout has occurred. If OL traffic lockout is detected in step 428, then in step 430 the priority order is temporarily set to MH, OL, OH, and ML in decreasing order, and this new priority order is used to choose a command in step 422. Since OL traffic lockout usually occurs when OH is occupying the bandwidth not allocated for managed traffic, it is necessary for the priority order to have OL at a higher priority, temporarily, than OH traffic. This allows OL traffic access to bandwidth, while preserving MH traffic's priority.

Since it is not possible for MH traffic to occupy 100% bandwidth, it can safely be given the highest priority in the priority order in step 430. It is, however, possible for ML and OH traffic to potentially lockout OL traffic, so they are given a lower priority than OL traffic in the priority order step 430.

If OH traffic lockout is not detected in step 428, then because step 424 preceded step 428, it means that neither lockout situation currently exists. Therefore, in step 432 the priority order is set to MH, ML, OH, and OL in decreasing order of priority, and this priority order is used to choose a command in step 422. Thus, priority order MH, ML, OH, and OL is used as the initial priority order and when no lockout situations have been detected. this method can be used to arbitrate access requests, of varying priority from multiple nodes, for any shared resource. The shared resource can be within a processor, within a computer, or in a computer network.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method of resource arbitration, the method comprising the steps of:
    defining four priority classes, managed high (MH), managed low (ML), opportunistic high (OH), and opportunistic low (OL), to access one or more resources;
    assigning a priority class to each resource access request;
    creating an access request concentrator (ARC) for each resource, through which each resource is accessed;
    choosing a resource access request at each ARC using the priority order MH, ML, OH, and OL, in decreasing order of priority;
    determining whether OH priority class resource access requests are locked out;
    upon a determination that OH priority class resource access requests are locked out, temporarily changing the priority order to OH, OL, MH, and ML, in decreasing order of priority;
    determining whether OL priority class resource access requests are locked out; and
    upon a determination that OL priority class resource access requests are locked out, temporarily changing the priority order to MH, OL, OH, and ML, in decreasing order of priority.

2. The method of claim 1, wherein the access request concentrator comprises at least one arbitration point.

3. The method of claim 2, wherein the resource being arbitrated is bandwidth.

4. The method of claim 3, wherein the resource access request is a command.

5. The method of claim 3, wherein the resource access request is a data component associated with a command.

6. A method of arbitrating between a plurality of resource access requests, the method comprising the steps of:
    defining four priority classes, managed high (MH), managed low (ML), opportunistic high (OH), and opportunistic low (OL);
    assigning a priority class to each of the resource access requests;
    dividing the resource access requests into subgroups;
    arbitrating between the resource access requests in each subgroup to obtain a smaller set of the resource access requests, wherein the arbitrating comprises:

choosing one of the resource access requests using the priority order MH, ML, OH, and OL, in decreasing order of priority;

determining whether OH priority class resource access requests are locked out;

upon a determination that OH priority class resource access requests are locked out, temporarily changing the priority order to OH, OL, MH, and ML, in decreasing order of priority;

determining whether OL priority class resource access requests are locked out;

upon a determination that OL priority class resource access requests are locked out, temporarily changing the priority order to MH, OL, OH, and ML, in decreasing order of priority; and arbitrating between the resource access requests in the smaller set to obtain a single one of the resource access requests.

7. An apparatus for providing resource arbitration, the apparatus comprising:

means for defining four priority classes, managed high (MH), managed low (ML), opportunistic high (OH), and opportunistic low (OL), to access one or more resources;

means for assigning a priority class to each resource access request;

means for creating an access request concentrator (ARC) for each resource, through which each resource is accessed;

means for choosing an access request at each ARC using the priority order MH, ML, OH, and OL, in decreasing order of priority;

means for determining whether OH priority class resource access requests are locked out;

upon a determination that OH priority class resource access requests are locked out, means for temporarily changing the priority order to OH, OL, MH, and ML, in decreasing order of priority;

means for determining whether OL priority class resource access requests are locked out; and upon a determination that OL priority class resource access requests are locked out, means for temporarily changing the priority order to MH, OL, OH, and ML, in decreasing order of priority.

8. The apparatus of claim 7 wherein the access request concentrator comprises at least one arbitration point.

9. The apparatus of claim 8 wherein the resource being arbitrated is bandwidth.

10. The apparatus of claim 9 wherein the resource access request is a command.

11. The apparatus of claim 9 wherein the resource access request is a data component associated with a command.

12. An apparatus for arbitrating between a plurality of resource access requests, comprising:

means for defining four priority classes, managed high (MH), managed low (ML), opportunistic high (OH), and opportunistic low (OL);

means for assigning a priority class to each of the resource access requests;

means for dividing the resource access requests into subgroups;

means for arbitrating between the resource access requests in each subgroup to obtain a smaller set of the resource access requests, wherein the arbitrating comprises:

choosing one of the resource access requests using the priority order MH, ML, OH, and OL, in decreasing order of priority;

determining whether OH priority class resource access requests are locked out;

upon a determination that OH priority class resource access requests are locked out, temporarily changing the priority order to OH, OL, MH, and ML, in decreasing order of priority;

determining whether OL priority class resource access requests are locked out;

upon a determination that OL priority class resource access requests are locked out, temporarily changing the priority order to MH, OL, OH, and ML, in decreasing order of priority; and means for arbitrating between the resource access requests in the smaller set to obtain a single one of the resource access requests.

13. A computer program product for providing resource arbitration, the computer program product having a medium with a computer program embodied thereon, the computer program comprising:

computer program code for defining four priority classes, managed high (MH), managed low (ML), opportunistic high (OH), and opportunistic low (OL), to access one or more resources;

computer program code for assigning a priority class to each resource access request;

computer program code for creating an access request concentrator (ARC) for each resource, through which each resource is accessed;

computer program code for choosing an access request at each ARC using the priority order MH, ML, OH, and OL, in decreasing order of priority;

computer program code for determining whether OH priority class resource access requests are locked out;

upon a determination that OH priority class resource access requests are locked out, computer program code for temporarily changing the priority order to OH, OL, MH, and ML, in decreasing order of priority;

computer program code for determining whether OL priority class resource access requests are locked out; and upon a determination that OL priority class resource access requests are locked out, computer program code for temporarily changing the priority order to MH, OL, OH, and ML, in decreasing order of priority.

14. The computer program product of claim 13 wherein the access request concentrator comprises at least one arbitration point.

15. The computer program product of claim 14 wherein the resource being arbitrated is bandwidth.

16. The computer program product of claim 15 wherein the resource access request is a command.

17. The computer program product of claim 15 wherein the resource access request is a data component associated with a command.

18. A computer program product for arbitrating between a plurality of resource access requests, the computer program product having a medium with a computer program embodied thereon, the computer program comprising:

computer program code for defining four priority classes, managed high (MH), managed low (ML), opportunistic high (OH), and opportunistic low (OL);

computer program code for assigning a priority class to each of the resource access requests;

computer program code for dividing the resource access requests into subgroups;
computer program code for arbitrating between the resource access requests in each subgroup to obtain a smaller set of the resource access requests, wherein the arbitrating comprises:
  choosing one of the resource access requests using the priority order MH, ML, OH; and OL, in decreasing order of priority;
  determining whether OH priority class resource access requests are locked out;
  upon a determination that OH priority class resource access requests are locked out, temporarily changing the priority order to OH, OL, MH, and ML, in decreasing order of priority;
  determining whether OL priority class resource access requests are locked out;
  upon a determination that OL priority class resource access requests are locked out, temporarily changing the priority order to MH, OL, OH, and ML, in decreasing order of priority; and
computer program code for arbitrating between the resource access requests in the smaller set to obtain a single one of the resource access requests.

* * * * *